US007819618B2

(12) United States Patent
Frost

(10) Patent No.: US 7,819,618 B2
(45) Date of Patent: Oct. 26, 2010

(54) LOADER DEVICE FOR ASSISTING IN LIFTING BULKY OBJECTS

(75) Inventor: Harlie D. Frost, Austin, TX (US)

(73) Assignee: Affinity Labs of Texas, LLC, Frisco, TX (US)

(*) Notice: Subject to any disclaimer, the term of this patent is extended or adjusted under 35 U.S.C. 154(b) by 737 days.

(21) Appl. No.: 11/449,020

(22) Filed: Jun. 8, 2006

(65) Prior Publication Data

US 2007/0286714 A1 Dec. 13, 2007

(51) Int. Cl.
*B60P 9/00* (2006.01)
(52) U.S. Cl. .............. 414/462; 414/467; 248/371; 248/398; 248/176.1
(58) Field of Classification Search .............. 248/176.1, 248/157, 177.1, 176.3, 188.1, 188.8, 371, 248/396, 398; 224/310, 331; 414/462, 467, 414/346, 334, 539; 297/195.11
See application file for complete search history.

(56) References Cited

U.S. PATENT DOCUMENTS

| 2,247,128 | A | | 6/1941 | Levey |
| 3,712,524 | A | | 1/1973 | Ames |
| 4,003,485 | A | | 1/1977 | Edgerton |
| 4,365,561 | A | * | 12/1982 | Tellier et al. .................. 108/7 |
| 4,531,879 | A | | 7/1985 | Horowitz |
| 5,197,393 | A | * | 3/1993 | Yeakle ........................ 108/10 |
| 5,957,350 | A | * | 9/1999 | Giles .......................... 224/310 |
| 6,467,843 | B1 | * | 10/2002 | Rossborough .......... 297/344.18 |
| 6,695,755 | B1 | * | 2/2004 | Huang ........................ 482/146 |
| 6,705,822 | B2 | | 3/2004 | Oldak |
| 6,719,566 | B2 | * | 4/2004 | Farenholtz et al. .......... 434/267 |
| 7,017,939 | B2 | * | 3/2006 | Darling, III ................. 280/652 |
| 7,219,956 | B2 | * | 5/2007 | Zhang ..................... 297/195.11 |
| 7,401,856 | B2 | * | 7/2008 | Marchand et al. ........... 297/314 |
| 2003/0230915 | A1 | * | 12/2003 | Checketts .............. 297/195.11 |
| 2006/0103222 | A1 | * | 5/2006 | Caruso et al. .......... 297/452.15 |
| 2007/0252419 | A1 | * | 11/2007 | Takahashi .................... 297/312 |
| 2009/0044731 | A1 | * | 2/2009 | Crook et al. ............. 108/50.14 |

* cited by examiner

*Primary Examiner*—J. Allen Shriver
*Assistant Examiner*—Todd M. Epps

(57) ABSTRACT

A device and method for loading bulky objects such as Kayaks, canoes and sailboards on a higher level. The device is an expandable and flexible platform to be used as an extra pair of hands for holding one end of the object and pivoting the other end on the loading platform such as a car roof. An expandable pole from a base with a platform on the top permits one end of an ungainly object to be fixed to the platform to hold and act as a pivot point. The flexibility allows for loading from multiple directions.

10 Claims, 3 Drawing Sheets

LOADER DEVICE FOR ASSISTING IN LIFTING BULKY OBJECTS

TECHNICAL FIELD

The following disclosure relates to a device useful for loading bulky and heavy objects on top of other objects such as the roof of a car.

BACKGROUND

It is difficult for one person to load an ungainly object such as a kayak, canoe, windsurfer or ladder on an object such as a ledge, shelf or car roof. The easiest method may be for two people to do the loading and unloading. Often, however, it is inconvenient to obtain a second person's help. The present invention makes the loading easier whether done by one or more but is designed primarily to assist one person with the loading.

There are a number of devices that are helpful in loading bulky objects on car tops. One type rolls the object up the back of the vehicle. See U.S. Pat. No. 2,247,128 (Levey). Another rolls it up and down the side of a vehicle. See U.S. Pat. No. 4,531,879 (Horowitz). Still another loads it on a frame that extends sideways from a roof rack and that then tilts up and slides into place. See U.S. Pat. No. 4,003,485 (Edgerton). One method involves putting an additional min-rack on the trunk of a car in order to have a more convenient place on which to slide the object. See U.S. Pat. No. 3,712,524 (Ames). These devices are cumbersome to use and relatively expensive to make compared to the present invention. One system involves a rack system with a v-shaped roller system under which a canoe, kayak, etc. has the front lifted to the back of the vehicle, attached to the rolling system and rolled onto the top. See U.S. Pat. No. 5,957,350 (Giles). It is a little expensive, relies on a type of roof rack and is limited in the direction from which the object can be loaded. It also involves a higher initial lift of the bulky object to get it started. U.S. Pat. No. 6,705,822 B2 (Oldak) involves a portable roller system that attaches to the front or rear of a vehicle. The kayak or canoe, etc. is lifted onto the roller device and then rolled onto the roof. The Oldak device has the advantage of portability and a shorter lift than other devices but is more expensive to build and is more limited in the directions of loading.

The present invention is intended to replace the second person holding one end of the bulky object. It is intended to have much of the flexibility of the person, a relatively low one ended lift, portability and the ability to load from multiple directions.

The present invention is similar to a music stand but is intended to load bulky objects rather than to adjust material for better viewing.

DESCRIPTION OF THE INVENTION

Figure 1:
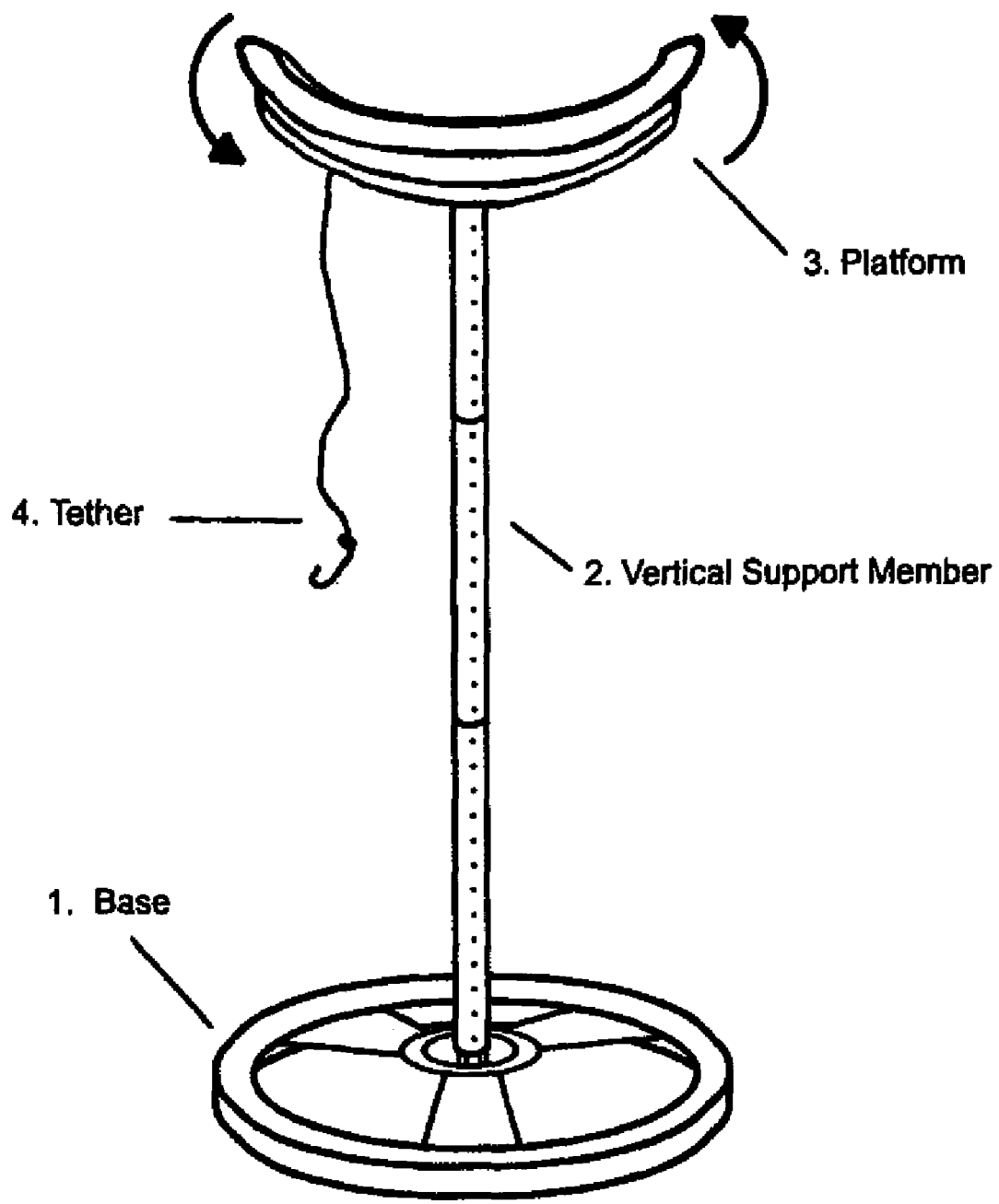
FIG. 1 illustrates a complete picture of one embodiment of the invention. It has a base 1 to which a first end of a vertical support member 2 is attached and a platform 3 attached to the second end of the vertical support member. A tether 4 is attached to the platform 3. The platform 3 is attached to the vertical support member 2.
Figure 2:
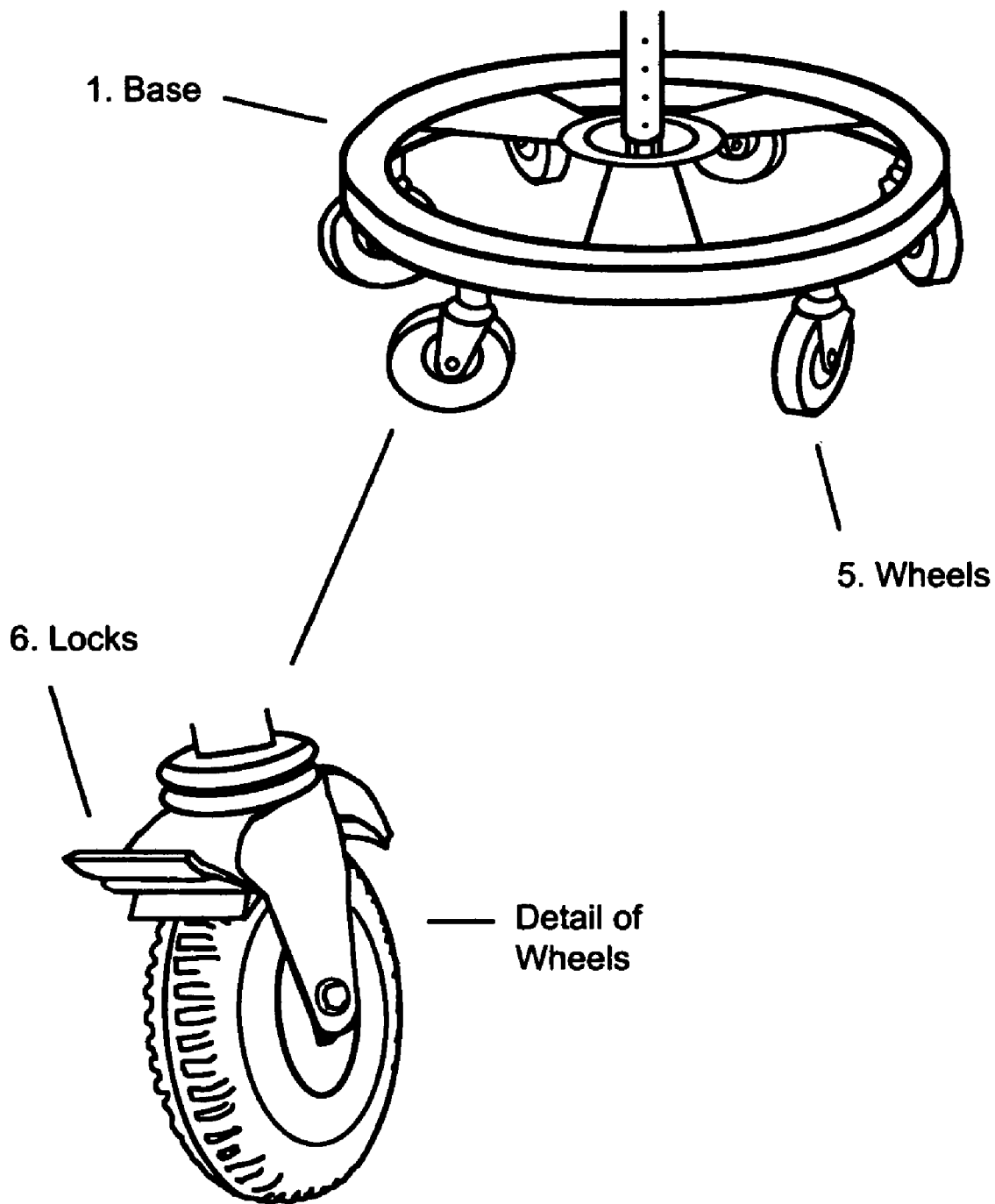
FIG. 2 illustrates a base 1 that has wheels 5 with locks 6.
Figure 3:
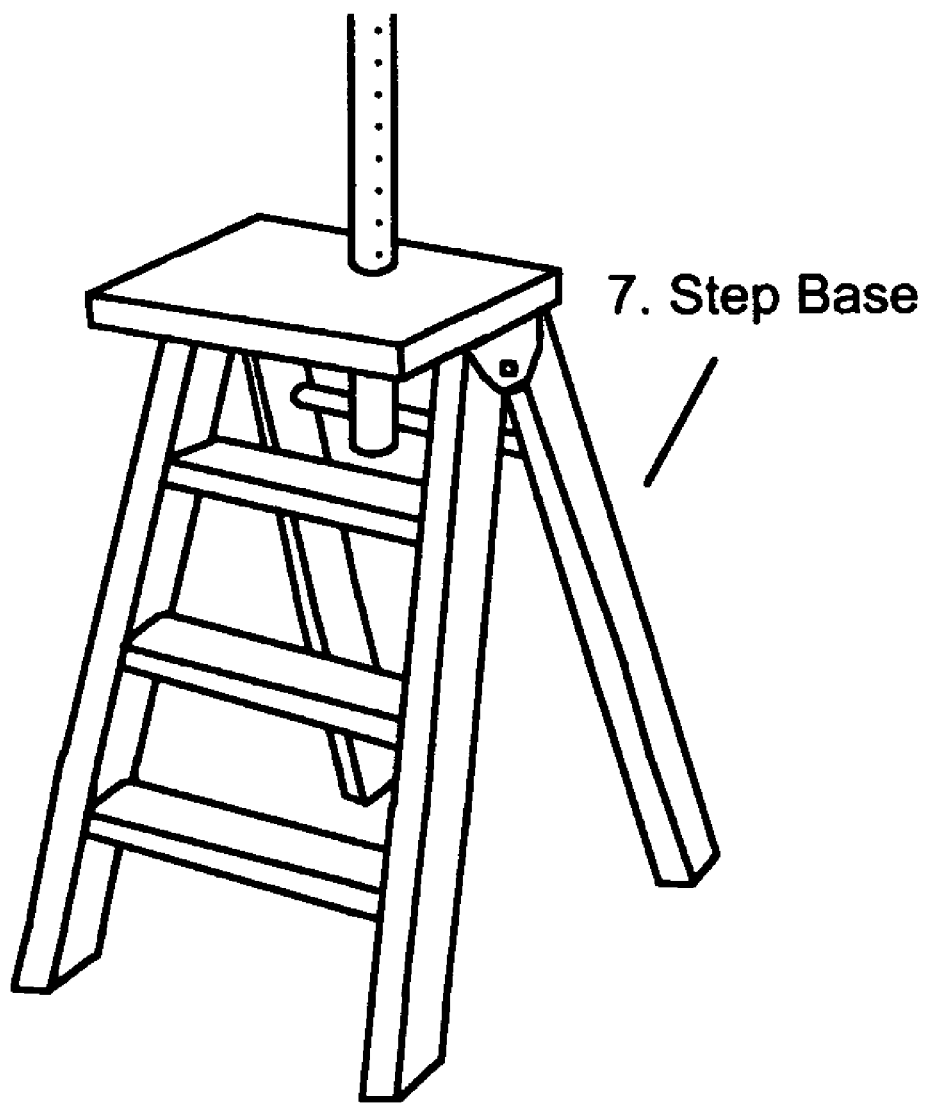
FIG. 3 illustrates a base 7 that consists of a step-ladder like device.

Loading bulky objects such as kayaks on a vehicle or shelf is ungainly, often resulting in strained muscles and damage to the vehicle or shelf, in the case of the vehicle including scraped paint and damage to windows and mirrors. The height of most vehicles, in particular, and the ungainly bulk of the object make it difficult to lift the object smoothly to the top of the vehicle. Similar difficulties apply to shelves, platforms, etc. Even if two people are available at the initial loading location, two people may not be available at the unloading point to unload or to reload the object. The loading mechanism needs to accommodate loading by one person both at home and away. Additionally, it needs to accommodate the ability to load from almost any angle to account for obstacles in garages, driveways or at a lake or stream. It should be cheap to make, easy to transport and easy to use.

The basic concept is to create an elevated platform on which to balance the first end of the bulky object and use the platform as a fulcrum point. A tether of some sort, bungy, tie, elastic loop, etc. may be useful in keeping the end of the object in place. The height of the platform should be the appropriate height to be able to swing the second end up and onto the loading area without scraping the side. Upon placing the second end on the vehicle or other loading area the first end is then removed from the platform and the first end is then rotated onto the vehicle or other loading area. The invention is not limited to one base or vertical support member. Two or more bases and vertical support members could be used with a platform structure between them.

The appropriate height can be achieved through a number of familiar means. Vertical support members of differing sizes could be attached to the base and the platform. Adjustable height vertical support members could be used. Mistral's Windglider has a system under which vertical support members are inserted into one another in different ways to achieve different heights. Simple systems involving small holes with small rods that slip into them, similar to the way in which windsurfing booms are adjusted, should work well. The vertical support member or rod could be permanently attached, especially if the vertical support member was adjustable but the device would be easier to transport if the pieces separated.

The base need not be round and the attachment of the rod or vertical support member need not be in the center. An elongated base with an attachment at the opposite end of the bulky object, for example, might give more stability. More than one place could be provided for the attachment of the vertical support member. The base could also be able to be shaped in more than one manner, such as with a series of arms that fold in and out.

The platform could be flat or shaped for the particular object. It could be made of semi-flexible material to shape as desired. Different platform shapes could be available and the platforms could be substituted. Additional platform flexibility could be achieved with the ability to tilt and rotate the platform on the vertical support member. A downward initial tilt of the platform could be useful in making the initial placement of the bulky object on the platform. The shape of the platform and tethering devices could add additional stability in maintaining the connection of the object with the platform. The lifting of the other end of the object could result in a tilt back up of the platform and a swiveling capacity of the platform on the vertical support member, could aid in placing the other end of the object on the loading area. Similarly rotation could be at the base attachment of the vertical support member or somewhere in the vertical support member itself.

A wheeled base may aid in flexibility of loading and unloading the platform. Stability may, however, require that the wheels have a locking mechanism similar to office chairs, wheel chairs, etc. Larger wheels allow the same base of the device to be used as a carrier for the object. The rod could be lowered or removed and the object, usually a kayak or a canoe in such case, could be attached to the base. The other end could be picked up and the bulky object rolled. Such a device without a vertical support member is frequently used to move kayaks to and from the water. A scissors like base is attached to two wheels. One end of the kayak is attached to the base and the other end is picked up and used to roll the kayak to the desired place. Such a device could be combined with the vertical support member and the platform to create a device that would have utility both as a loader and a device to roll the object and could be made cheaper and be more portable than both devices separately.

The use of two of the devices in combination would make loading even easier. The ends could, in turn, be raised gradually to make the lifts each small. Additionally, if the wheeled based variety is used and the object is longer than the length of the object with a loading area, such as a car and roof, that the object is loaded upon, the loaders could be set higher than the top of the loading area and the devices wheeled around the front and back of the object and then lowered to the desired position. For example, if a kayak was to be loaded on a car with a car top carrier with two wheeled loading devices, the devices could be set up either at the right and left rear of the car perpendicular to the length of the car. The kayak or other bulky object could be loaded on the two loading devices. The devices could then be wheeled along the length of the car to the approximate middle of the car top carrier. The kayak could be lowered to the carrier and then spun on the rack into place.

It is often useful to use a short step-ladder to help with attaching an object to an automobile, truck, ledge etc. The base could be a short step-ladder to which the vertical support member is attached. This adds stability to the loading process and provides a handy step-ladder for work in securing the kayak or other bulky object to the loading platform. The step-ladder design could also be on wheels with brakes giving the loader the step-ladder and wheeled device advantages.

I claim:

1. A device to assist in loading an object comprising:
   a base;
   a platform configured to support a first end of the object, wherein the platform is to be a fulcrum point for the object and on which the first end of the object is balanced, the platform being at a height to enable a second end of the object to be moved onto a loading area located above the platform; and
   a vertical support member configured to couple to the base at a first terminal end of the vertical support member and to the platform at a second terminal end of the vertical support member, wherein the platform has a shape to allow the first end of the object to rotate on the platform by movement of the second end of the object toward the loading area, wherein the platform is to have an initial downward tilt when the object is placed on the platform and is configured via the vertical support member to be at a height to enable the movement of the second end of the object onto the loading area, the object comprising a kayak, a canoe, a windsurfer, or a ladder.

2. The device in claim 1, wherein the vertical support member is expandable.

3. The device in claim 1, wherein the platform is rotatable on the vertical support member.

4. The device in claim 1, wherein the platform is formed in part of a flexible material comprising cloth or webbing.

5. The device in claim 1, wherein the platform has a cord like device for securing the object more securely to the platform.

6. The device in claim 1, wherein the platform comprises a frame with flexible netting that is held apart by use of a spring like device that closes in on the end of the object due to the force of gravity.

7. The device in claim 1, wherein the platform is capable of being shaped to better fit different ungainly objects.

8. The device in claim 1, wherein the platform may be replaceable with other shaped platforms.

9. The device in claim 1, wherein the vertical support member is rotatable in the base.

10. A device comprising:
    a base;
    a platform configured to support a first end of a bulky object to be loaded on top of a second object, wherein the platform is to be a fulcrum point for the bulky object and on which the first end of the bulky object is balanced, the platform being at a height to enable a second end of the bulky object to be moved onto the top of the second object located above the platform;
    a tethering device coupled to the platform to secure the first end of the bulky object to the platform; and
    a vertical support member configured to couple to the base at a first terminal end of the vertical support member and to the platform at a second terminal end of the vertical support member, wherein the platform is tiltable and rotateable on the vertical support member and has a substantially semicircular shape to allow the first end of the bulky object to rotate on the platform by movement of the second end of the bulky object toward a loading area on the top of the second object and, in connection with the tethering device, to maintain connection of the bulky object with the platform, wherein the platform is to have an initial downward tilt when the bulky object is placed on the platform and is configured via the vertical support member to be at a height to make the movement of the second end of the bulky object onto the loading area without contacting a side of the second object, the bulky object comprising a kayak or a canoe.

* * * * *